June 18, 1946.
A. GUERRA
2,402,394
AUTO DASH OIL DETECTOR
Original Filed Jan. 26, 1939
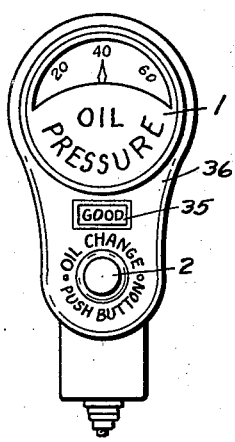
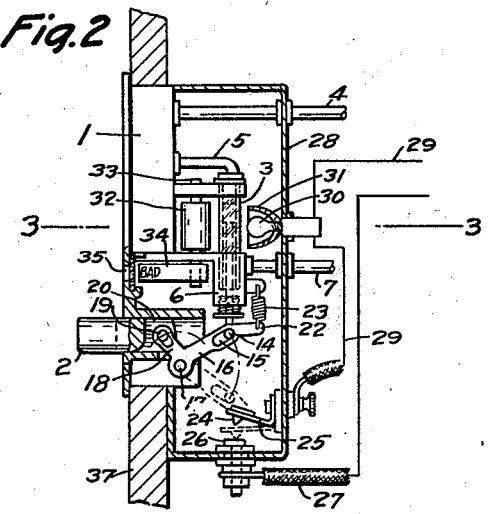
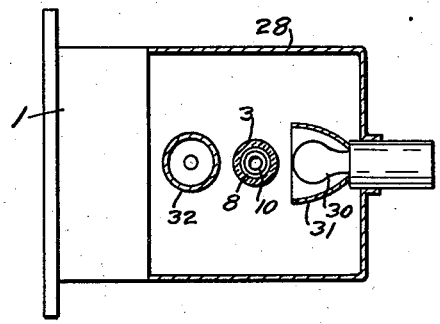
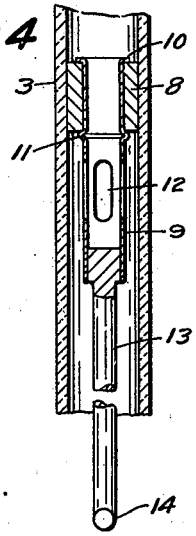
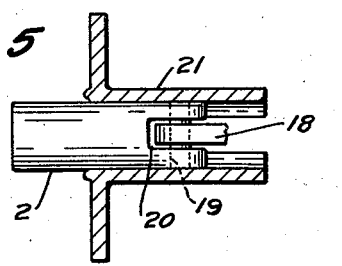
INVENTOR.
Anthony Guerra
BY
ATTORNEY.

Patented June 18, 1946

2,402,394

UNITED STATES PATENT OFFICE 2,402,394

AUTO DASH OIL DETECTOR

Anthony Guerra, Hackensack, N. J.

Refiled for abandoned application Serial No. 252,865, January 26, 1939. This application September 8, 1945, Serial No. 615,148

10 Claims. (Cl. 177—311)

1

This application is a refile of my abandoned application 252,865, filed January 26, 1939.

The purpose of this invention is to provide a relatively small instrument, preferably in combination with an oil gage or meter, whereby one may readily determine the condition of the oil of a motor vehicle from the instrument board.

The invention is a device having a button that may be pressed inward which, when pressed inward, completes a circuit to a lamp, the rays of which pass through a transparent tube through which the oil of the vehicle passes continuously, with the rays registering upon an exposure meter which operates a segment containing the words "Good" or "Bad," so that either word will show through a window in the front of the instrument.

Many devices have been provided for detecting the characteristics or determining the condition of oil and many of these comprise electric light rays passing through a film of oil and registering upon some form of meter, however, in most of these devices, the oil is taken from the crankcase and tested, whereas it is desired to provide such a device that is adapted to be positioned upon the instrument board of a motor vehicle and through which the oil flows continuously so that the condition of the oil may be determined without removing the oil from the vehicle and at any time.

The object of this invention is, therefore, to provide a simple, unique and compact device adapted to be incorporated in an instrument of a motor vehicle which will readily show the condition of the oil of the vehicle.

Another object is to provide a device for indicating whether or not the oil of the vehicle should be changed, in which the condition of the oil is determined by passing light rays through oil in a transparent container, in which means is provided for cleaning the interior of the container when the device is used.

Another object is to provide a device for readily determining the characteristics of the oil of a motor vehicle which may be used while the vehicle is in operation.

Another object is to provide means for determining the condition of the oil of a motor vehicle which may be incorporated in the oil meter or pressure indicator.

A further object is to provide a device for indicating the condition of the oil of a motor vehicle through which the oil passes continuously while the vehicle is in operation.

A still further object is to provide means for

2 readily determining the condition of the oil of a motor vehicle without removing the oil from the vehicle, in which the oil is not visible.

And a still further object is to provide a device for readily determining the characteristics of the oil of a motor vehicle which may be incorporated in an instrument board which is of a simple and economical construction.

With these ends in view the invention embodies a gage through which oil passes continuously, a glass tube inserted in the oil connection to the meter, a cell adapted to be influenced by light rays, a source of light adapted to throw light rays through the oil and upon the cell, a button by which the device may be operated, a cleaning device operated by the button, and a switch also operated by the button for lighting the light forming the source of light rays.

Other features and advantages of the invention will appear from the following description taken in connection with the drawing, wherein:

Figure 1 is a view showing a front elevation of the device.

Figure 2 is a cross section through the device with parts shown in elevation, and showing the device installed in the instrument board of a motor vehicle.

Figure 3 is a cross section on line 3—3 of Figure 2, with parts shown in elevation and parts omitted.

Figure 4 is a detail through the transparent oil containing tube.

Figure 5 is a detail showing the button mounting.

In the drawing the device is shown as it may be made wherein numeral 1 indicates an oil indicator or meter, numeral 2 a button by which the device is operated, and numeral 3 a transparent tube through which the condition of the oil is registered.

The oil indicating device 1 may be the same as that used in motor vehicles at the present time, and this may be provided with a connection 4 to the crank case of the engine or oil pump, and also a return connection 5 so that the oil may pass to the device through the connection 4 and return through the connection 5 or vice versa.

The connection 5 opens into the upper end of a glass tube 3, the lower end of which is mounted in a small casing 6, and the side of the casing is provided with an outlet connection 7 through which the oil passes back to the crank case of the engine or oil pump connection. Inside of the tube 3 is a cleaning plunger 8 formed as shown in Figure 4 with an opening extending therethrough so that the oil may flow continuously through the tube. This tube and plunger may be formed as shown in Figures 3 and 4, however, it will also be understood that any means may be provided for bypassing oil in the tube around the plunger with the plunger in the upper position. In the design shown the plunger 8 is formed of a relatively small, thin tube 9 with the sponge-like portion 8 adapted to wipe or clean the inner surface of the tube 3, and this part is mounted on the upper end of the tube 9 with a flange 10 at the top and a bead 11 adapted to hold the part 8 which is in the form of a ring in place. Below the plunger 8 are a plurality of openings 12 so that oil passing downward through the upper end of the tube may pass through the plunger and out into the glass tube 3. The lower end of the tube 9 is provided with a rod 13 with a pin 14 at the lower end which extends into a slot 15 in a lever 16 pivotally mounted on a pin 17, and the lever 16 is provided with an offset connection 18 which is pivotally connected to the button 2 with a pin 19, as shown in Figures 2 and 5, with the part 18 extending into a slot 20 in the button. The button is slidably mounted in a bearing 21, and it will be noted that, as the button is pressed inward, it will force the opposite end 16 of the lever downward, thereby drawing the plunger 8 downward and wiping the inner surface of the tube; and, when the plunger is in the lower position, the oil may flow freely through the tube 3 and out of the return connection 7, whereas with the plunger in the upper position the oil flowing through the tube will pass through the plunger. The outer end of the lever 16 is provided with an arm 22 by which the lever is resiliently held upward by the spring 23.

It will be noted that, with the parts arranged in this manner, the button 2 may be pressed inward so that the lever 16 will be forced downward, and the end 22 thereof will engage a contact 24 on a spring 25, and this will move downward to engage another contact 26 which is connected to a wire 27 through the lower part of the inner casing 28. The contact 24 may also be connected through the casing by insulating washers to a wire 29, and the wires 27 and 29 may extend to any suitable source of electric current.

The wire 29 is connected through the base of a lamp 30 having a reflector 31, and the lamp is positioned to send rays of light through the tube 3 and against the device 32 which may be an exposure meter or any device adapted to be operated by rays of light, and it will be understood that it may operate in any manner. In the design shown the cell 32 is provided with an extending rotatable shaft 33, and on the lower end of the shaft is a segment 34 which is adapted to show through an opening 35 in the face 36 of the oil indicator 1, and if the oil is clear, the word "Good" will show through the opening 35, whereas if it is dirty and needs changing, the word "Bad" will show through this opening.

It will be understood that other changes may be made in the construction without departing from the spirit of the invention. One of which changes may be in the use of this device independent of the oil indicator, as it may be connected in the oil line at any point, another may be in the use of other means for operating the device, and still another may be in the use of other means for indicating the condition of the oil when the device is operated.

The construction will be readily understood from the foregoing description. In use the device may be installed in the instrument board, which is indicated by the numeral 37, of a motor vehicle in combination with the oil indicator or independent thereof, and, when it is desired to ascertain the condition of the oil, the button 2 may be pressed inward, and this will operate the plunger 8 to wipe sediment from the inner wall of the transparent tube 3, and, at the same time, it will complete a circuit through the light 30 so that a light beam will be sent through the tube and against the exposure meter or other light beam operated indicating device, and, as this operates, it will cause the words "Good" or "Bad" to show through the opening 35. Any other words instead of the words "Good" or "Bad" may be used, and any other directions may be used on the casing instead of the wording shown, or any color or other means may be used to designate the condition of the oil.

Having thus fully described the invention what I claim as new and desire to secure by Letters Patent is:

1. An oil condition indicating device for instrument boards of motor vehicles comprising a transparent tube positioned in the oil circulating system of the vehicle where oil of the transmission case of the engine thereof will pass through continuously when the engine is operating, a light sensitive instrument positioned on one side of said tube with a shaft of the light sensitive member thereof extending therefrom, a light positioned on the opposite side of said tube with rays therefrom passing through the tube adapted to effect a movement of the said shaft of the light sensitive instrument, and indicating means on the end of said shaft visible from the front of an instrument board in which the device is mounted, showing the condition of the oil.

2. A device as described in claim 1, having a switch in a circuit to the light, a button for closing said switch as desired, and resilient means for opening said switch.

3. A device as described in claim 1, having a switch in a circuit to the light, a plunger with a free passage therethrough in said tube, and a button with connections for closing said switch and moving said plunger through the tube to light the light and clean the tube as desired.

4. A device as described in claim 1, characterized by a cleaning plunger in said tube, and means moving said plunger through the tube from the face of the instrument board.

5. An oil condition indicating device, adapted for use in instrument boards of motor vehicles, comprising a transparent tube inserted in the oil system of the engine of the vehicle where oil of the engine passes therethrough continuously, a light on one side of said tube, a light sensitive instrument on the opposite side of the tube, positioned to be influenced by light rays passing through the tube, and indicating means operated by the light sensitive instrument readable from the face of the instrument board.

6. An oil condition indicating device as described in claim 5, having means lighting the light when a reading is desired.

7. An oil condition indicating device as described in claim 5, having means lighting the light and cleaning the interior of the tube.

8. An oil condition indicating device as described in claim 5, having a switch in a circuit in which the light is connected, and a button on the instrument board for operating said switch.

9. An oil condition indicating device as described in claim 5 having a switch in a circuit in which the light is connected, and a button on the instrument board for operating said switch, said button connected to the switch through a bell crank, and said bell crank operating a hollow plunger in the said transparent tube for cleaning the tube.

10. In combination with a motor vehicle having an instrument board and an oil circulating system, means readable at the face of the instrument board for indicating by electrical means the condition of the oil, means closing a circuit in the electrical means to operate the device as desired, and means cleaning an oil passage thereof through which the condition of the oil is indicated, as it is operated.

ANTHONY GUERRA.